Patented Jan. 10, 1950

2,493,984

UNITED STATES PATENT OFFICE 2,493,984

ETCHING COMPOUND

George R. McKay, Garden City, N. Y., assignor to McKay Chemical Company, Inc., Brooklyn, N. Y., a corporation of New York No Drawing. Application November 13, 1947, Serial No. 785,817

3 Claims. (Cl. 41—42)

This invention relates to the etching or frosting of glass and has particular reference to an improvement in agents used for that purpose.

Hydrofluoric acid, an aqueous solution of hydrogen fluoride, has long been recognized as one of the most efficient glass etching agents for commercial purposes because of its powerful action on silica and silicates in general. It has been found, however, that the effective life of the conventional hydrofluoric acid etching solution is not so long as could be desired. In commercial practice such a solution loses its etching strength gradually, the rapidity of the loss being apparently dependent to some extent on the type of glass being etched. When the solution has become weakened, the etching or frosting tends to lack uniformity. Particularly is this true where the articles being etched are made of glass containing cords, which are marks in glass generally caused by unequally melted portions of the glass batch in the furnace. Hard glass is especially difficult to etch and requires a strong solution of the acid.

By reason of the uncertainty which attaches to the rate at which the strength of the solution diminishes, it is very difficult to determine at what point its strength has been so reduced as to result in an unsatisfactory etch. This uncertainty and the resulting unsatisfactory products are the cause of considerable waste.

By my invention a uniformly strong aqueous solution of hydrofluoric acid may be maintained over far more extended periods of active etching use. This results in a more uniformly good etched product at considerably less cost because of the greatly increased useful life of the etching agent.

I have discovered that the desirable results outlined above may be obtained by adding some form of amorphous carbon, preferably so-called activated carbon, to the hydrofluoric acid solution. The carbon lengthens the useful life of the solution to a very great extent. While the explanation for this cannot be stated with certainty, it seems probable that the carbon inhibits any reaction between the acid solution and silicon tetrafluoride gas, which is formed when the acid solution is brought into etching contact with the silica of the glass.

Referring particularly now to the use of hydrofluoric acid, it has been found that, when a strong solution thereof is brought in contact with silica, silicon tetrafluoride and water are formed. In the presence of an excess of hydrofluoric acid, the silicon tetrafluoride combines with it to form hydrofluosilicic acid, which is not a good etching agent. Theoretically there would be a tendency for the tetrafluoride gas to hydrolyze in the presence of the water to form silicon hydroxide and hydrofluosilicic acid, the silicon so formed combining with the hydrogen fluoride to initiate an endless chain reaction forming additional hydrofluosilicic acid and silicon hydroxide. But tetrafluoride is one of the most active of the halogens and its reaction with the excess hydrofluoric acid to immediately form hydrofluosilicic acid and water would be the preference reaction.

Furthermore, hydrolysis of the tetrafluoride with the water formed simultaneously when the glass is brought into contact with the etching solution would initiate a reversible reaction and for that reason also hydrofluosilicic acid and water only would be formed when the glass is brought into etching contact with the hydrofluoric acid. The action of hydrofluoric acid on silicates is similar, which is true also with what is known as ordinary "soda-glass."

Activated carbon is known to be a powerful adsorption agent. While amorphous carbon in some other form, such as ordinary charcoal in powdered form, could be used, the rapidity of action and the large capacity of activated carbon render this particular adsorption agent preferable.

Absorption of the silicon tetrafluoride, the reaction product of the glass silicates and the hydrofluoric acid, precludes its reaction directly or indirectly with the hydrofluoric acid in the etching solution, thus preventing a substantial loss of hydrofluoric acid and consequent loss in the strength of the solution.

Glass frosting or etching compounds may be made in a number of ways and the manner of forming the same constitutes no part of this invention. For commercial purposes glass frosting compounds are customarily made with ammonium bifluoride or calcium fluoride together with barium sulphate, as a filler for translucency, and an acid.

Frequently in the past it has been necessary, in order to insure minimum effective strength of the solution over a period of time which is feasible for commercial operations, to prepare an initial solution of a strength which was considerably in excess of that necessary. For this reason there was a tendency to commence operations using a solution with more powerful etching capacity than is desirable and the result was overfrosting or overetching which, in many instances, involved considerable waste. By the use of carbon I have found that the strength of the initial solution may be regulated to eliminate loss from this cause, and that the effective life of the solution so prepared is equal to or greater than the conventional solution prepared initially at excess strength to maintain a reasonable effective life.

In practicing my invention I have found that about 1 part activated carbon to 145 parts etching compound, the parts being by weight, produces excellent results. I have also found that when using activated carbon in this approximate proportion the strength of the solution as initially prepared may be considerably reduced and the effective life extended when compared with that of the conventional solution. Addition of the carbon permits considerable reduction in the ammonium bifluoride used to obtain the hydrofluoric acid and some reduction in the reaction acid used with the bifluoride and barium sulphate in forming the etching compound.

While no maximum or minimum proportion of carbon has been determined with finality, the invention described and claimed herein resides broadly in the use in solution of an adsorption agent capable of absorbing the reaction product which occurs when the silica in the glass contacts the hydrofluoric acid, i. e., silicon tetrafluoride, thus preventing reaction of the acid therewith to form hydrofluosilicic acid with consequent reduction in the strength of the etching solution. While carbon in the form of charcoal or activated carbon, the latter being preferable and determined by actual usage to be extremely satisfactory, has been specifically described herein, it is believed quite possible that other adsorption agents may be satisfactory.

Having described a preferred embodiment of the invention, I do not wish to be limited other than by the scope of the appended claims.

What I claim is:

1. A glass etching agent comprising hydrofluoric acid and amorphous carbon.
2. A glass etching agent comprising hydrofluoric acid and activated carbon.
3. A glass etching agent comprising hydrofluoric acid and carbon.

GEORGE R. McKAY.

REFERENCES CITED

The following references are of record in the file of this patent:

UNITED STATES PATENTS

| Number | Name | Date |
| --- | --- | --- |
| 2,118,386 | Swinehart | May 24, 1938 |
| 2,446,060 | Pray | July 27, 1948 |